(12) United States Patent
Tu et al.

(10) Patent No.: US 8,902,715 B2
(45) Date of Patent: *Dec. 2, 2014

(54) INFORMATION INTEGRATION METHOD AND TOUCH DISPLAY DEVICE USING THE SAME

(75) Inventors: Chang-Jhu Tu, Taipei (TW); Chun-Yi Wang, Taipei (TW); Jian-Wei Gong, Taipei (TW)

(73) Assignee: Asustek Computer Inc., Taipei (TW)

( * ) Notice: Subject to any disclaimer, the term of this patent is extended or adjusted under 35 U.S.C. 154(b) by 74 days.

This patent is subject to a terminal disclaimer.

(21) Appl. No.: 13/592,874

(22) Filed: Aug. 23, 2012

(65) Prior Publication Data

US 2013/0058198 A1 Mar. 7, 2013

(30) Foreign Application Priority Data

Sep. 2, 2011 (TW) .............................. 100131729 A (51) Int. Cl.
*G04B 19/24* (2006.01)
*G04G 21/08* (2010.01)

(52) U.S. Cl.
CPC ................ *G04B 19/24* (2013.01); *G04G 21/08* (2013.01)
USPC .............................. 368/30; 368/223; 368/242

(58) Field of Classification Search
CPC .. G04C 17/00; G04C 17/0091; G04G 9/0082; G04G 9/02; G04B 25/00
USPC ....................... 368/223, 239, 241, 242, 28-30
See application file for complete search history.

(56) References Cited

U.S. PATENT DOCUMENTS

| | | | |
|---|---|---|---|
| 7,333,092 B2 | 2/2008 | Zadesky et al. | |
| 2004/0225966 A1* | 11/2004 | Besharat et al. | 715/705 |
| 2006/0007785 A1* | 1/2006 | Fernandez et al. | 368/10 |
| 2007/0036603 A1 | 2/2007 | Swoboda | |
| 2007/0060205 A1* | 3/2007 | Kim | 455/566 |
| 2009/0059729 A1 | 3/2009 | Olayinka et al. | |
| 2010/0157742 A1* | 6/2010 | Relyea et al. | 368/28 |
| 2010/0162170 A1* | 6/2010 | Johns et al. | 715/834 |
| 2010/0214875 A1 | 8/2010 | Wilson et al. | |
| 2011/0110198 A1* | 5/2011 | Bulsink et al. | 368/96 |

FOREIGN PATENT DOCUMENTS

| | | |
|---|---|---|
| CN | 200410043595 | 11/2005 |
| TW | I238348 | 8/2005 |
| TW | I327286 | 7/2010 |
| TW | 201106249 | 2/2011 |

* cited by examiner

*Primary Examiner* — Amy Cohen Johnson
*Assistant Examiner* — Matthew Powell
(74) *Attorney, Agent, or Firm* — Muncy, Geissler, Olds & Lowe, P.C.

(57) ABSTRACT

An information integration method applied to a touch display device includes the steps of displaying a time indicating unit on the touch display device, obtaining at least one event information, and displaying the event information as at least one information display unit on the touch display device in accordance with time data associated with the event information and in correspondence with the time indicating unit. A touch display device performing the information integration method is also disclosed.

18 Claims, 10 Drawing Sheets

INFORMATION INTEGRATION METHOD AND TOUCH DISPLAY DEVICE USING THE SAME

CROSS REFERENCE TO RELATED APPLICATIONS

This Non-provisional application claims priority under 35 U.S.C. §119(a) on Patent Application No(s). 100131729 filed in Taiwan, Republic of China on Sep. 2, 2011, the entire contents of which are hereby incorporated by reference.

BACKGROUND OF THE INVENTION

1. Field of Invention

The disclosure relates to a display method and a touch display device using the same. In particular, the disclosure relates to an information integration method and a touch display device using the same.

2. Related Art

By means of the flourishing development of mobile devices and the popularization of the wireless network, the convenience of mobile internet has been significantly enhanced, so that the habits of the users using the network are radically changed while network communities are caused. More particularly, the recently emerging social network service websites or micro-blogs have become an indispensable portion of the daily life of the modern human beings.

However, as the types of the community websites or micro-blogs are gradually diversified, the user is troubled to switch between different pages to share the information of the friends and relatives one by one. Specifically, since the interfaces of different community websites or micro-blogs cannot be unified, the user has to be re-adapted to the interfaces at each time, and the operations are felt to be complicated. Alternatively, since the display frame is limited but multiple application programs or websites have to be opened frequently, the user has to log in and out frequently. More particularly, if the same event content is posted on different community websites or micro-blogs at the same time, the information cannot be integrally obtained at a time, and the user is forced to distinguish the browsing order and tends to sacrifice or ignore a portion of messages, thereby indirectly affecting the willingness of use.

Some manufacturers have tried to collect the information of different community websites or micro-blogs using software or programs, and list the information in a frame for the user to browse. However, such the display method with the text descriptions and the annotated time only can sort the events according to the order of occurrences. It is difficult for the user to instinctively have the impressions for the starting time, the ending time or the elapsed time of the event, and the user cannot judge whether the events overlap with each other. So, it is disadvantageous to the handling or programming of time. Thus, this kind of software only can be referred to as the information software, which cannot provide a good information integration method.

SUMMARY OF THE INVENTION

This disclosure provides an information integration method and a touch display device using the same, which can collect and show the information of the community websites or micro-blogs on a single frame, so that the user can browse the information conveniently without the complexity of switching between different interfaces. In addition, the method of displaying the information can let the user intuitively handle the starting time, the ending time or the elapsed time, so that the user can further judge the relative time relationships between the events and the information integration effect can be indeed achieved. In detail, this disclosure is also adapted to the integration of the schedule information of the calendar, for example, to display the scheduled events, such as appointments, in the frame. Thus, it is further advantageous for the user to integrally browse or program his/her own schedule, thereby increasing the time utilization efficiency.

The information integration method and the touch display device using the same according to the disclosure are adapted to the working with the orientation sensing technology to individually display the event information coming from different community websites, micro-blogs or application programs by way of orientation change. Thus, the disclosure provides the user for the touch and the more direct operation mode that can be easily judged, so that the user can rapidly and targetedly browse the required information, and the unnecessary interference can be reduced.

An information integration method applied to a touch display device comprises the steps of: displaying a time indicating unit on the touch display device; obtaining at least one event information; and displaying the event information as at least one information display unit on the touch display device in accordance with time data associated with the event information and in correspondence with the time indicating unit.

A touch display device comprises a touch display module and a processing module. The touch display module displays a time indicating unit. The processing module obtains at least one event information and displays the event information as at least one information display unit on the touch display module in accordance with time data associated with the event information and in correspondence with the time indicating unit.

As mentioned above, in the information integration method and the touch display device using the same according to the disclosure, the received event information is displayed in accordance with its time data and in correspondence with a time indicating unit to form an information display unit. Because the time indicating unit can let the user specifically have the time impression, the starting time, the ending time and the elapsed time of the adjacently displayed information display unit can be instinctively judged, and the integration contains collecting the scattered information, and further makes the user comprehensively handle the information or check his/her own time utilization efficiency through the design ingenuity. In addition, the information obtaining source of this disclosure may be extended to a remote server, built-in software or a storage module, for example, to comprehensively integrate the communicated or contacted matters and the given schedules. Similarly, the time indicating unit also serves as a reference so that the user can easily judge whether the events are overlapped or how long the idle time between the events is. This is advantageous to the increase of the time utilization efficiency.

These and other features, aspects and advantages of the present disclosure will become better understood with regard to the following description, appended claims, and accompanying drawings.

DETAILED DESCRIPTION OF THE INVENTION

Figure 1A:
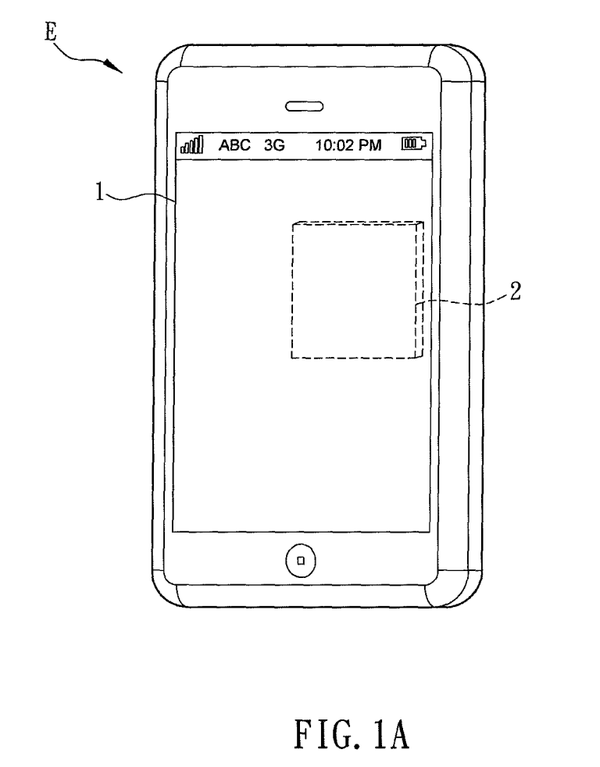
FIG. 1A is a schematic illustration showing the exterior of a touch display device according to a first embodiment of the disclosure.
Figure 1B:
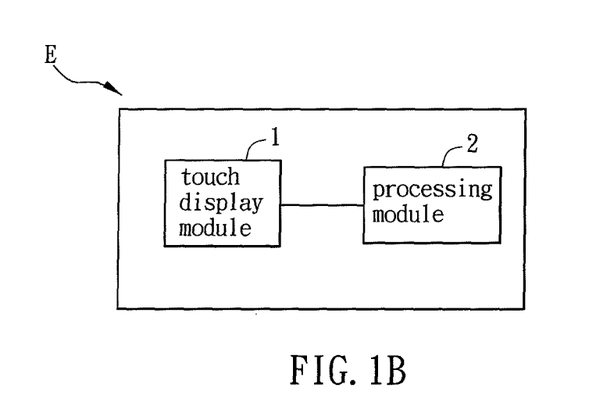
FIG. 1B is a system block diagram showing the touch display device of FIG. 1A.

FIG. 1A is a schematic illustration showing the exterior of a touch display device E according to a first embodiment of the disclosure, while FIG. 1B is a system block diagram showing the touch display device E of FIG. 1A.

Referring to FIG. 1A, the touch display device E of this embodiment may include, without limitation to, any portable or mobile electronic device, and has a touch display module 1 and a processing module 2 electrically connected to the touch display module 1. Preferably, the touch display device E may be, for example but without limitation to, a smart mobile phone, a personal digital assistant (PDA), a tablet personal computer (tablet PC) or a navigation device with a global positioning system function.

Because this technology relates to the display method of information integration, the frame displayed by the touch display module 1 of the touch display device E will be described by way of example if the contents or drawings mentioned hereinbelow are not particularly specified.

Figure 2A:
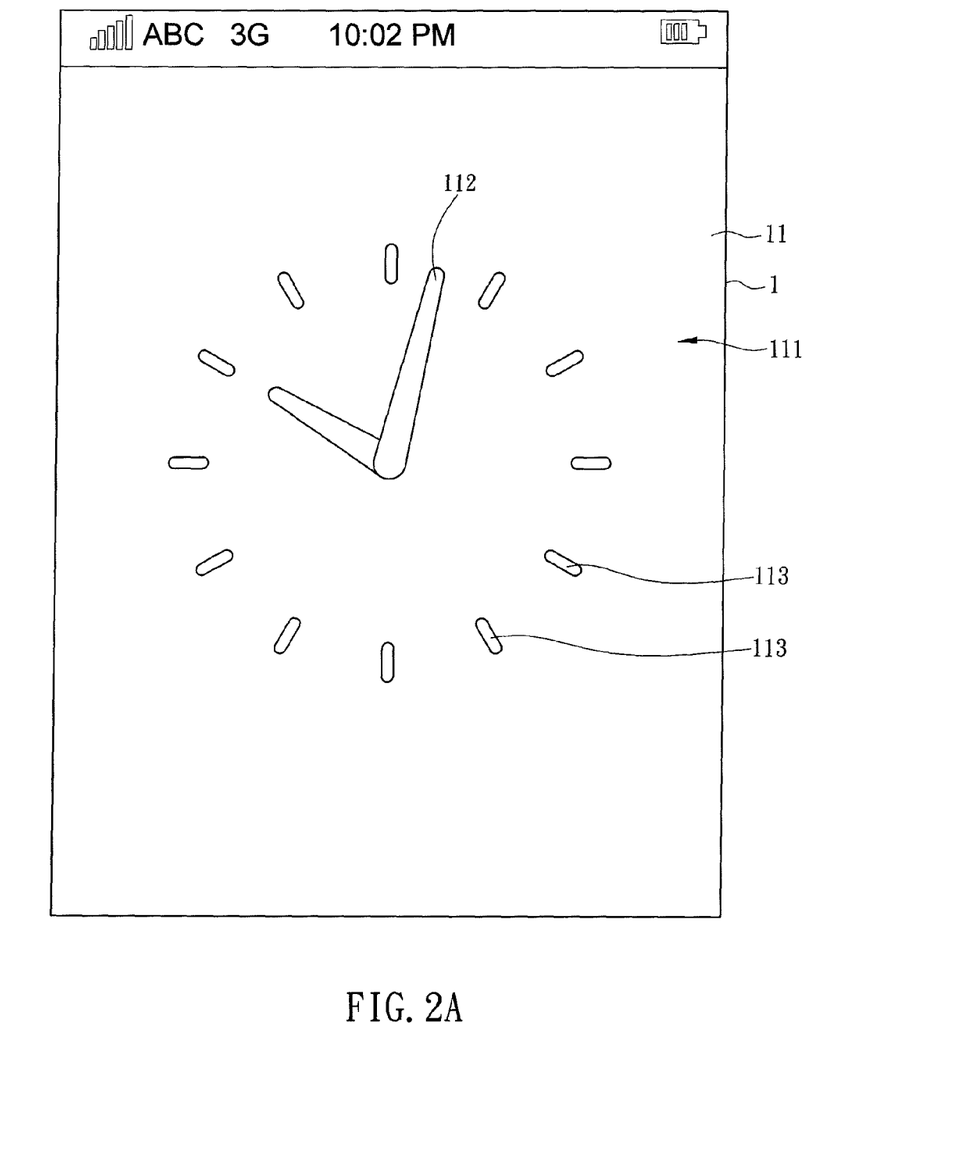
FIG. 2A is a schematic illustration showing a video frame of an operation interface of a display application program of the touch display device of FIG. 1A.

The touch display device E of this disclosure can display, for example, a main frame, a desktop, a standby frame or an operation interface of an application program, which includes a time indicating unit, on the touch display module 1 through an operation system, software or the application program. FIG. 2A is a schematic illustration showing a video frame of an operation interface of a display application program of the touch display device of FIG. 1A. Referring to FIG. 2A, the touch display module 1 of this embodiment displays an operation interface 11 of the application program, and the operation interface 11 includes a time indicating unit 111.

In this embodiment, the time indicating unit 111 has a real time 112 and a plurality of marks 113 arranged corresponding to the time unit. Specifically, the time indicating unit 111 can be, for example, an analog clock shown in the drawing, and the time displayed on the time indicating unit 111 represents the current time, which is the so-called real time 112. For example, the time of 10:02 will be described as an example in this embodiment, and the marks 113 may be points, line segments or any other patterns, which are arranged in accordance with and corresponding to the time unit so as to visually divide the overall time indicating unit 111 into a plurality of blocks and to satisfy the user's usual reading mode of 12 hours.

It is to be specified that the time indicating unit 111 is not restricted to the representation of the analog clock or its similar mode, and other embodiments will be described in hereinbelow. In addition, the real time 112 and the marks 113 also need not to exist solely or simultaneously. In one embodiment, for example, if the external frame of the time indicating unit 111 has presented the distinguishable circular, the user can easily imagine it as an analog clock and can substantially read the information without the mark 113. In addition, if the electronic device is additionally designed to display the current time or the user needs not to know the current time, then the time indicating unit 111 may also have no real time 112. So, the disclosure is not particularly restricted thereto.

Referring to FIG. 1B, the touch display device E may utilize the processing module 2 to obtain an event information, the source of which may be provided by, for example but without limitation to, a server, a storage module in the touch display device E or the touch display device E executing an application program. The three example conditions will be further described in the following.

When the event information is provided by the server, preferably the server of a community website or a micro-blog, or any other remote server having the function of enabling the users to exchange messages, the contents of the event information may include texts, image or video/audio data. Of course, the event information may be actively provided by the server by way of wired or wireless transmission, or the touch display device E may automatically acquire the event information from the server. So, the disclosure is not particularly restricted to the provision of the event information.

When the event information is provided by the storage module in the touch display device E, the so-called "storage module" may be any form of memory, and the event information may be the information, which is obtained from other devices or servers and stored. The information may be, for example but without limitation to, the file information or invitation information, which is obtained from the community website, micro-blog or mail server and stored, or the information of schedule, appointment or task, which is inputted by the user and stored.

The event information may also be directly provided by the touch display device E executing an application program. For example, the user executes a browser, a calendar, a notebook or the like through the processing module 2 to set the event information provided by a schedule, an appointment or a task.

After the touch display device E obtains the event information, the processing module 2 may be utilized to display the event information on the touch display module 1 in accordance with time data associated with the event information. The time data associated with the event information may be, for example: (a) the time when the event information is established or stored, such as the time when the others post texts or articles on the community website or the micro-blog; (b) the time when the event information is set or scheduled, such as the appointment time set using the calendar application program; or (c) the time when the processing module 2 obtains the event information, such as the time when the others send the event information to the touch display device E through the short messages, or the time when the touch display device E obtains the event information from the community website or the micro-blog through the application program. It is to be specified that the time data associated with the event information may include, for example but without limitation to, the starting time data, the ending time data, the elapsed time data and/or any other time data, which are/is meaningful for the user and can be judged by the processing module 2.

Figure 2B:
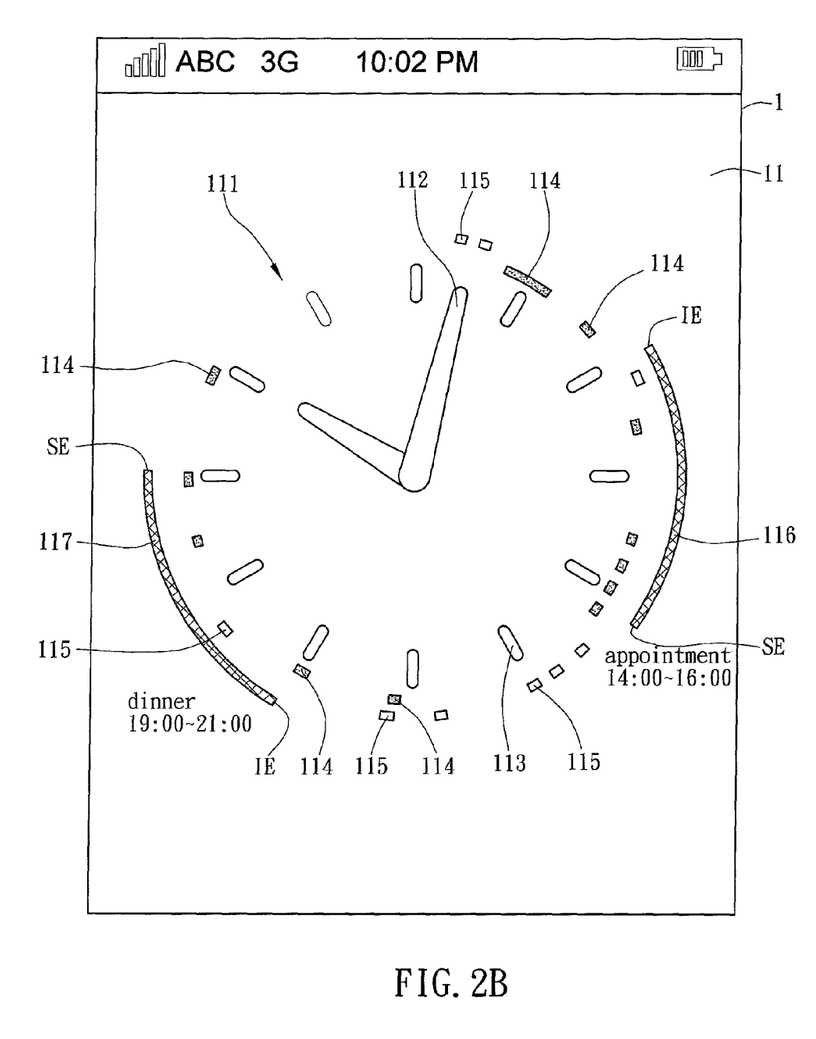
FIG. 2B is a schematic illustration showing the event information displayed on the video frame of FIG. 2A.

FIG. 2B is a schematic illustration showing the event information displayed on the video frame of FIG. 2A. Referring to FIG. 2B, the touch display device E of this embodiment may utilize the processing module 2 to analyze and read the time data associated with the event information, and then display the event information as at least one information display unit on the video frame of the touch display module 1 in accordance with the time data and in correspondence with the time indicating unit 111. Although multiple information display units 114 and 117 are displayed in this example embodiment, one, two, three, five or any number of information display units may be displayed in other embodiments or utility conditions.

In this embodiment, the information display units 114 to 117 may be divided into multiple groups to be described later. Herein, one representative information display unit 114 between one o'clock and two o'clock will be described in detail. The information display unit 114 of this embodiment may be in the form of, without limitation to, point(s), line segment(s) or any other pattern(s). The event information displayed by the information display unit 114 may be the event information obtained by the touch display device E from the micro-blog community website Plurk, and the portion of the time indicating unit 111 corresponding to the information display unit 114 is 13:40, which represents that the event information is transmitted to the micro-blog community website Plurk at 13:40.

The display method of the information display unit of this disclosure is on the basis of corresponding to the time indicating unit, is not restricted to any form, and is preferably indicated in this embodiment. That is, the information display units 114 to 117 are displayed on the outer side of the circumference of the time indicating unit 111. In detail, in addition to displaying information on the outer side of the circumference by the information display units 114 to 117 of this embodiment, the touch display device E may further divide the display positions of the information display units 114 to 117 in accordance with the source, from which the event information is obtained. For example, the event information of this embodiment may be obtained from the micro-blog, the community website and the built-in calendar application program, respectively. The distances from the time indicating unit 111 to the information display units, displayed in correspondence with the event information of the same source, are the same. For example, the distances from the time indicating unit 111 to the information display units 114, displayed in correspondence with the event information in correspondence with the source of micro-blog Plurk, are the same, and the information display units 114 surround the time indicating unit 111. Similarly, the distances from the time indicating unit 111 to the information display units 115 to 117, displayed and obtained from the community website Facebook or calendar application program, are the same.

Therefore, in the above-mentioned relationships, the information display units 114 to 117, displayed in correspondence with the event information of different sources, may establish the visual effect similar to concentric circles or radial patterns with respect to the time indicating unit 111, so that the user can easily distinguish between the meanings represented by different information display units, and this is advantageous to the operation convenience. Of course, as shown in FIG. 2B, the distinguishabilities between the information display units 114, 115, 116 and 117 obtained from different sources may also be enhanced according to, for example but without limitation to, the shape, brightness, color, texture or a combination thereof.

It is to be specified that the information display units 114 frequently appear at about the one o'clock direction has the ring-shaped or arc-shaped visual effect because many event information are obtained in a short period of time. In addition, because the information display units 116 and 117 are established in accordance with the event information, which may be the dinner and appointment events having the continuity on the time relationship, in the calendar application program, the details and times may be displayed around the information display unit 116, and the initial end IE and the stopping end SE may be possessed. Herein, taking the information display unit 116 as an example, the initial end IE is the starting time of the expected appointment and is represented as 14:00; and the stopping end SE is the ending time of the appointment and is represented as 16:00. The length of the information display unit 116 (or referred as a fan-shaped angle) may represent the time length of the elapsed time of the event, and is equal to two hours.

Accordingly, the user can integrate different sources of event information through the display method of this disclosure, and can easily judge and handle the relative time relationships between the events with reference to the time indicating unit 111.

Referring again to FIG. 2B, it is to be specified that when the two different sources of event information partially or entirely overlap with each other in the time relationship (e.g., the event information represented by the information display units 114 and 115 at the portion around 18:00). Because one of the information display units 114 and 115 (e.g., the information display unit 115) is further from the center of the time indicating unit 111 to have the larger radius, the information display units 114 and 115 are arranged in concentric circles or radial patterns to facilitate the distinguishing. Of course, this disclosure does not intend to restrict the condition regarding which source of event information should have the larger radius, or which source of event information should be closer to the center of the time indicating unit 111, and the user may set the condition by himself or herself so that the event information that occurs earlier have the smaller radius, or the more important event information have the smaller radius, so that the visual feeling of locating on the ring closer to the center can be obtained.

A different aspect of this disclosure will be described with reference to another embodiment.

Figure 3:
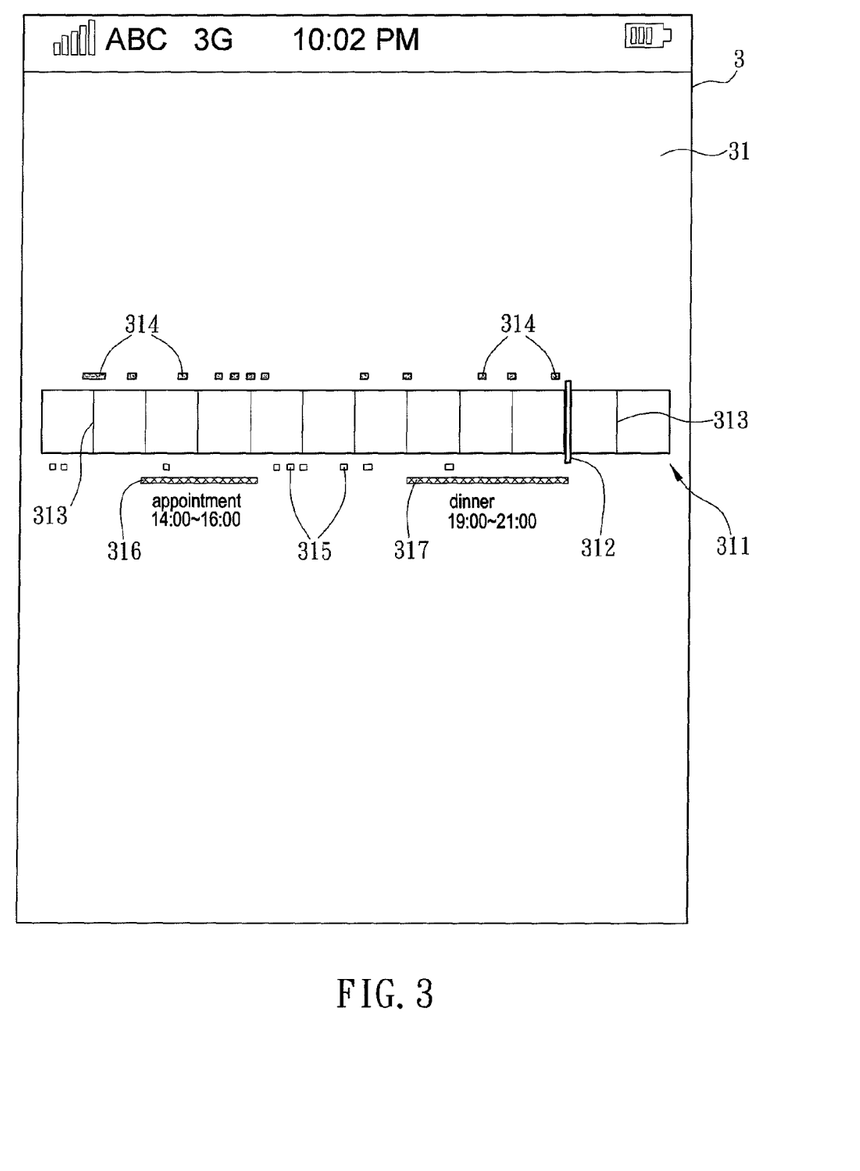
FIG. 3 is a schematic illustration showing a video frame of a touch display device according to another embodiment of the disclosure.

FIG. 3 is a schematic illustration showing a video frame of a touch display device according to another embodiment of the disclosure. As shown in FIG. 3, an operation interface 31, a time indicating unit 311, a real time 312, a plurality of marks 313 and a plurality of information display units 314 to 317 displayed by a touch display module 3 of the touch display device of this embodiment are similar to the operation interface 11, the time indicating unit 111, the real time 112, the marks 113 and the information display units 114 to 117 displayed by the touch display module 1 of the above-mentioned embodiment. In addition, the technological characteristics of the device and its display method of this embodiment are also substantially the same as those of the above-mentioned embodiment, and can be found hereinabove, so detailed descriptions thereof will be omitted. It is to be specified that the time indicating unit 311 of this embodiment has the 12-hour time axis, and the information display units 314 to 317 are points, line segments or other patterns. In detail, the information display units 314, 315, 316 and 317 with the same source are arranged substantially in parallel, and display the information on two sides of the time indicating unit 311 in correspondence with the time represented by the time indicating unit 311. Thus, the user may easily feel the time advancing, and can additionally move the time indicating unit 311 and the information display units 314 to 317 leftwards to serve as the elapsed time so that the real-time updating effect may be obtained.

Figure 4A:
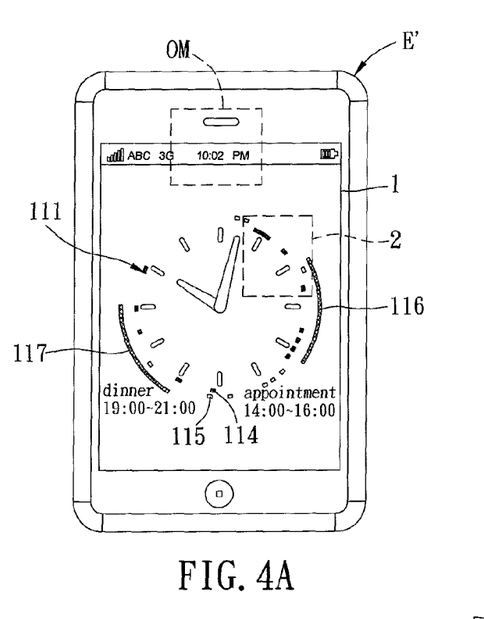
FIGS. 4A to 4C are schematic illustrations showing display frame changes on a touch display device whose orientation is changed according to another embodiment of the disclosure.
Figure 4B:
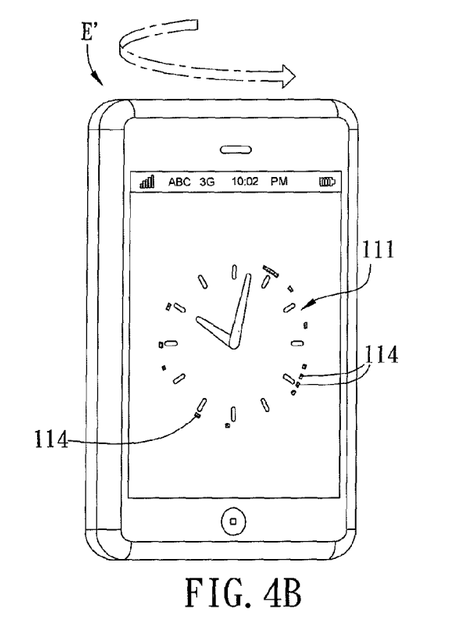
Figure 4C:
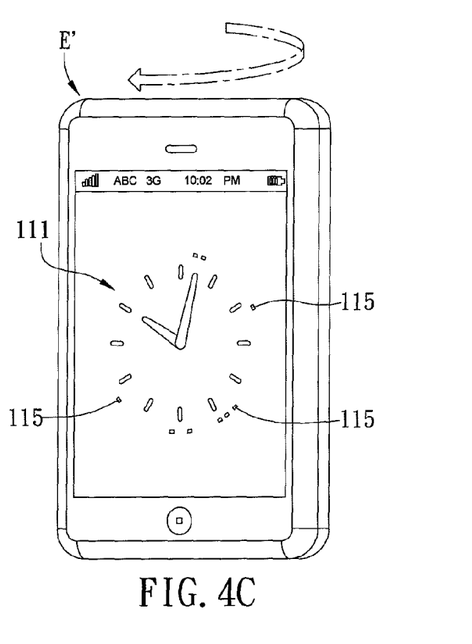

FIGS. 4A to 4C are schematic illustrations showing display frame changes on a touch display device whose orientation is changed according to another embodiment of the disclosure. Referring first to FIG. 4A, the touch display device E' of FIG. 4A according to this embodiment displays a plurality of information display units representing a plurality of sources of different event information, and the sources of the event information may include a first source and a second source. Herein, the first source is the community website Facebook corresponding to the information display unit 115; and the second source is the micro-blog Plurk corresponding to the information display unit 114. In addition to the element structure of the electronic device of the above-mentioned embodiment, the electronic device E' further has an orientation sensing module OM, which may sense an orientation change event and output a signal to the processing module 2.

Therefore, when the user wants to rotate the touch display device E' rightwards, as shown in FIG. 4B, the orientation sensing module OM senses a first orientation change event, and outputs a first signal to the processing module 2 so that the processing module 2 controls the touch display module 1 according to the first signal and switches the display frame into the frame solely displaying the event information provided from the micro-blog Plurk. That is, as shown in FIG. 4B, the touch display module 1 only displays the event display unit 114.

As shown in FIG. 4C, if the user rotates the touch display device E' leftwards, the orientation sensing module OM senses a second orientation change event and outputs a second signal to the processing module 2, so that the processing module 2 controls the touch display module 1 according to the second signal, and switches the display frame into the frame solely displaying the event information provided from the community website Facebook. That is, as shown in FIG. 4C, the touch display module 1 only displays the event display unit 115.

Of course, the implementation of this technology is not restricted to the type of the orientation sensing module OM, and this technology may be embodied as a gyroscope, a three-axis accelerator or a G sensor. The rotation angle of the touch display device E' sensed by the orientation sensing module OM is also not restricted, and may range from 20 to 60 degrees, and is preferably equal to 30 degrees. In addition, after switching, the display frame may be fixed and is no longer affected by the orientation change. Alternatively, after returning to the original orientation, the display frame switches back to the original state. The disclosure is not particularly restricted thereto.

Also, before rotation, the touch display module 3 may also be modified to display a third source of the information display unit, so that the user can see the data contents between the rotation angles. The third source maybe, for example but without limitation to, the schedule record in the calendar.

Figure 5A:
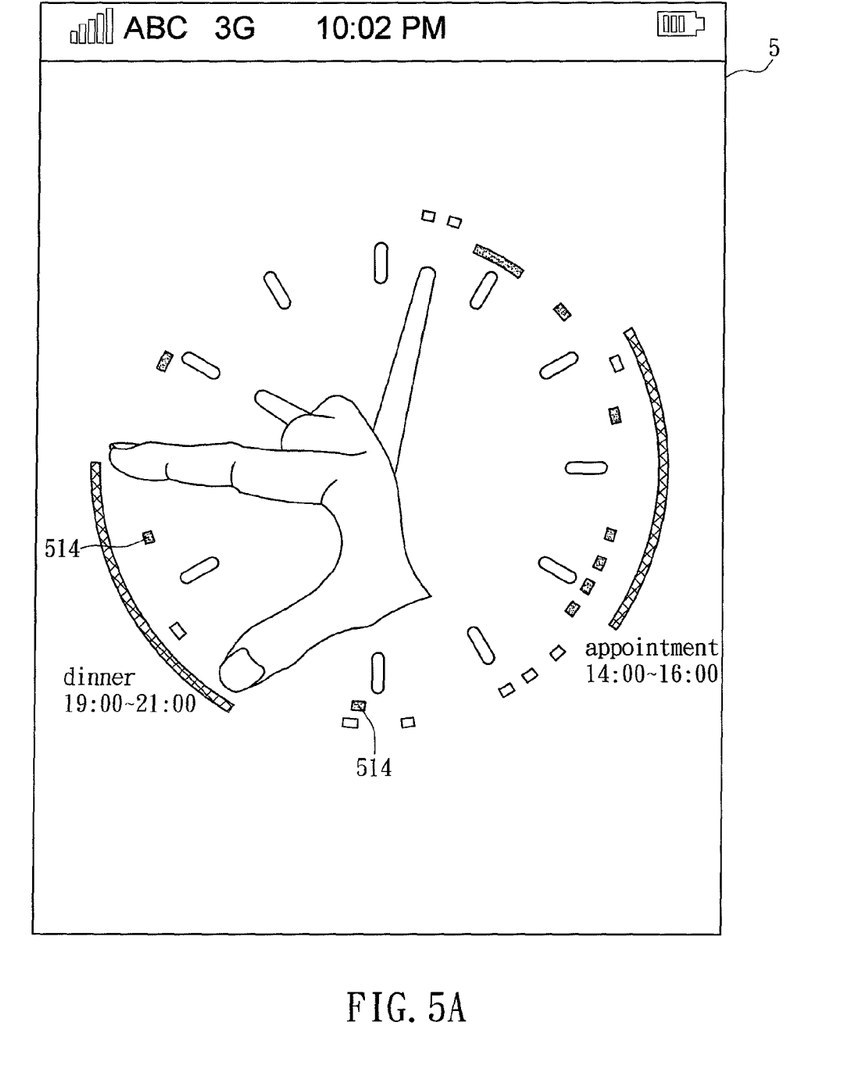
FIG. 5A is a schematic illustration showing operations of a touch display device for receiving touch events according to another embodiment of the disclosure.
Figure 5B:
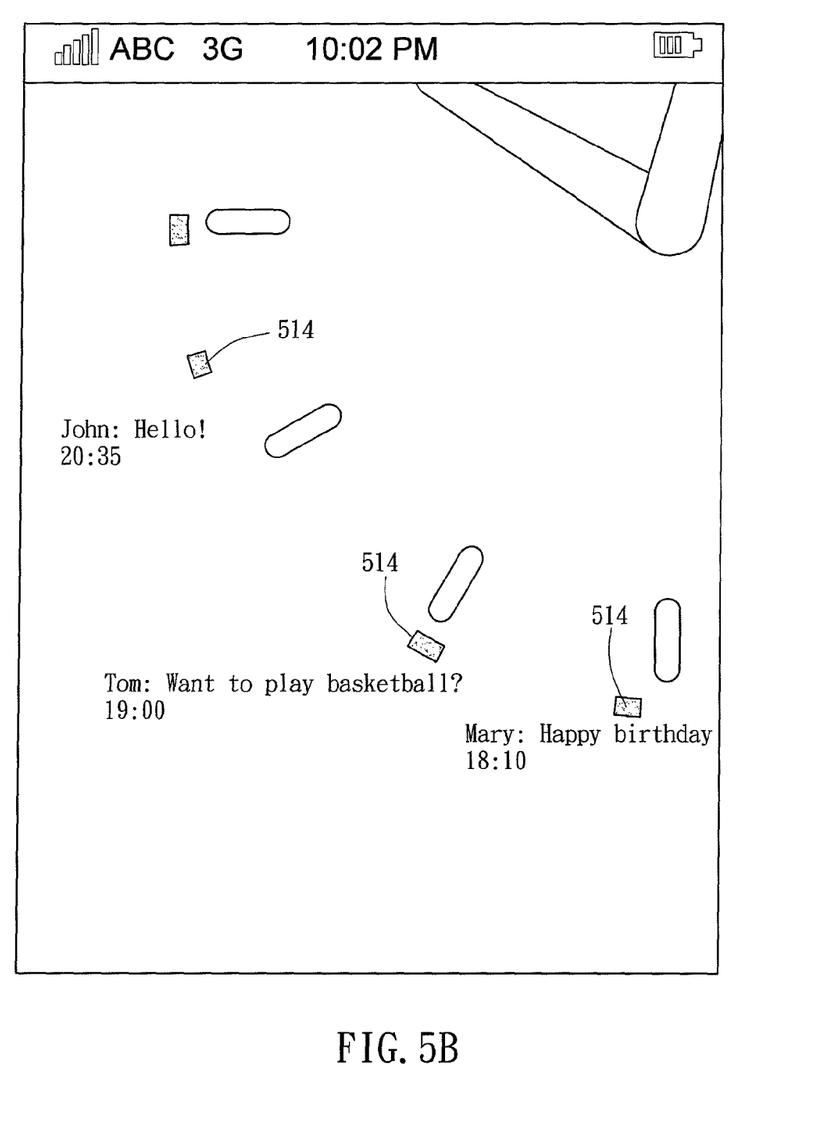
FIGS. 5B and 5C are schematic illustrations showing video frames displayed after the touch display device of FIG. 5A receives the touch events.
Figure 5C:
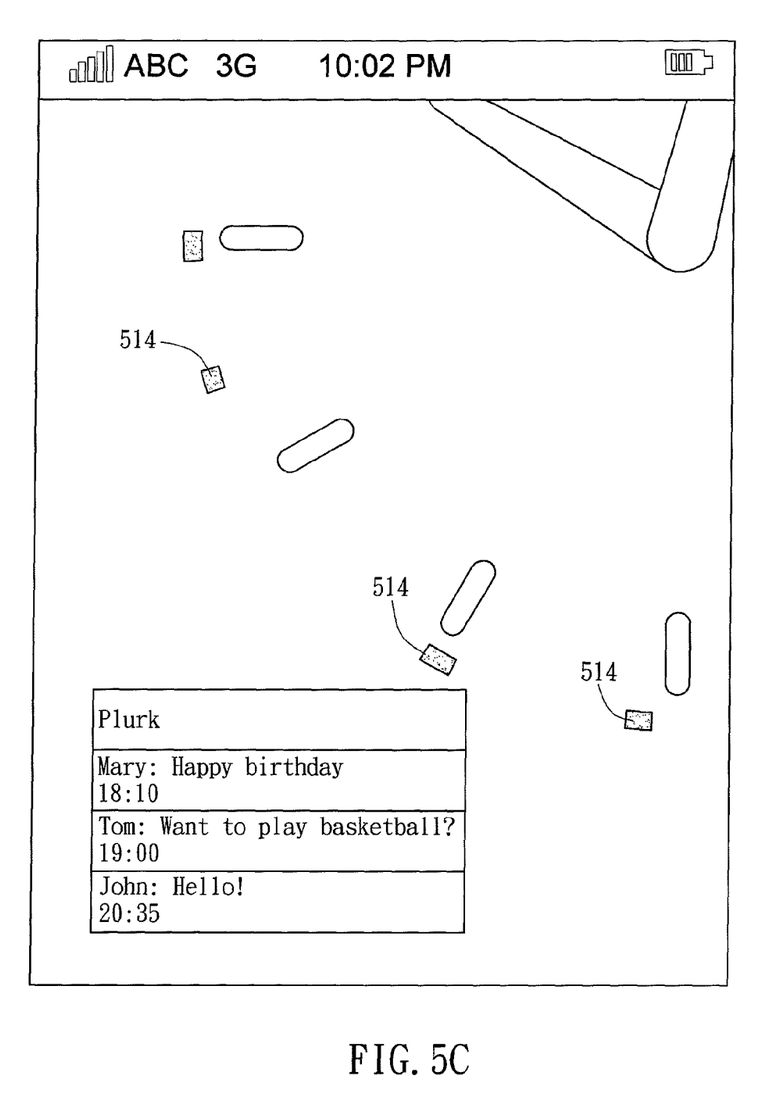

FIG. 5A is a schematic illustration showing operations of a touch display device for receiving touch events according to another embodiment of the disclosure. FIGS. 5B and 5C are schematic illustrations showing video frames displayed after the touch display device of FIG. 5A receives the touch events. Referring to FIG. 5A, the touch display device of this embodiment similarly has the element structure and the technological characteristic of the touch display device E shown in FIG. 1B, and thus can receive the touch event through the touch display module. After the touch display device receives a touch event, inputted by the user, through the touch display module 5 and outputs a signal, the processing module zooms and/or expands an information display unit 514 in accordance with the signal generated by the input event. In this embodiment, the touch event may be, for example but without limitation to, the event that the user operates the touch display module 5 in a single-point or a multi-point manner.

More specifically, the single point manner includes clicking, touching or pressing, and may further cover the displacement of a distance along a straight line or a curve after the contact. For example, the single-click and single direction sliding, the single-click and clockwise sliding or the single-click and counterclockwise sliding can be performed on the touch display module 5. The multi-point manner may be, for example but without limitation to, performing the multi-point and single direction sliding, the multi-point and clockwise or counterclockwise sliding or the multi-point radially outward operation or multi-point inward contraction on the touch display module 5. As shown in FIG. 5A, the operations of two fingers sliding in different directions to perform the touches on the touch display module 5 and within a region to be zoomed or expanded may pertain to the multi-point radially outward operation.

FIGS. 5B and 5C show two different aspects of zooming and expanding of the information display unit 514, respectively. In FIG. 5B, because the user executes the touch event in the specific region, the region and its neighboring information display units 514 are zoomed, so that the user can easily view the data (i.e., the data transferring or receiving history to/from the remote server) contained therein. In FIG. 5C, the user directly clicks multiple information display units 514, so the information display unit 514 can expand a menu to show the associated internal data after receiving the input event. This is the same as FIG. 5B, and can achieve the further viewing effect.

However, it is to be specified that the zooming or expanding of the information display unit 514 does not intend to restrict the extent and the number of times. For example but without any restrictive purpose, the relatively important data can be zoomed or expanded at a first time, and the specific data can be reviewed or more data details can be shown after another touch event. In addition, although the above-mentioned two aspects only display the specific source of information display unit 514 after zooming or expanding, all information display units in the region or the selected information display units can be zoomed or expanded in another non-restrictive embodiment.

Figure 6:
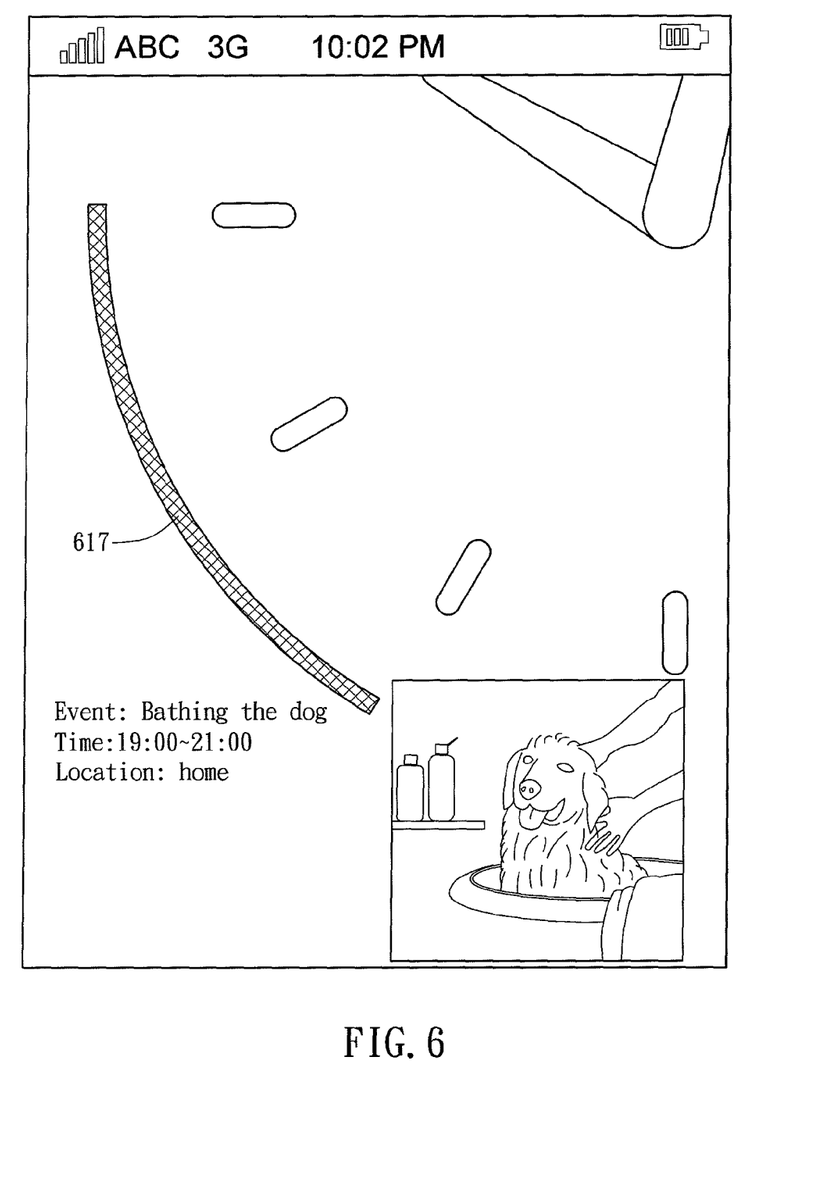
FIG. 6 is a schematic illustration showing a display frame of a touch display device according to another embodiment of the disclosure.

FIG. 6 is a schematic illustration showing a display frame of a touch display device according to another embodiment of the disclosure. Referring to FIG. 6, the touch display device of this embodiment is the same as the touch display device of the above-mentioned embodiment, and may also receive the touch event through the touch display module. So, the user can accordingly input the touch event to call or start the specific application program, software or instruction, and thus to edit the information contents of the information display unit.

Specifically, as shown in the drawing, the user can, for example, provide a touch event, and edit a data display unit 617 representing bathing event information to add an associated message of bathing a dog therein, or to add the funny photo or sound in bathing therein in the form of multimedia files and show the information by way of image files, specific symbols or icons. Therefore, when the user makes the similar clicking or touching, the files recorded in or around the event display unit 617 can be zoomed and displayed.

Of course, the object to be edited is not restricted to the event information associated with the calendar, and the event information provided by the micro-blog or community website may also be edited. In addition, the editing process is not restricted to the addition of the data, and may also include deleting or adjusting the data contents. The forms of data are also not restricted to the above-mentioned forms, and other data such as drawings, photos, images, music, coordinates, memos or data contents may also be applied. Thus, the rich records and display contents can be provided to the user, and may be outputted as pictures or texts, or recorded into diaries.

Figure 7:
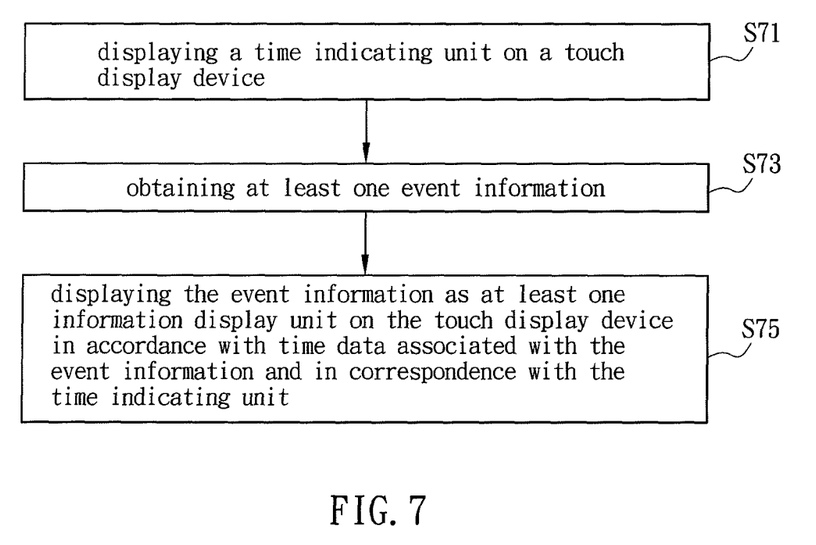
FIG. 7 is a flow chart showing steps of an information integration method according to an embodiment of the disclosure.

Referring to FIG. 7, this disclosure additionally discloses an information integration method applied to a touch display device. The information integration method includes the steps of displaying a time indicating unit on a touch display device (S71); obtaining at least one event information (S73); and displaying the event information as at least one information display unit on the touch display device in accordance with the time data associated with the event information and in correspondence with the time indicating unit (S75). The technological characteristics and implementing details of this information integration method are substantially the same as the technological characteristics and the operations of the method used in the touch display device of the above-mentioned embodiment in integrating and displaying the event information. So, references may be made to the above-mentioned contents, and detailed descriptions thereof will be omitted.

Compared with the prior art, the information integration method of the disclosure and the touch display device using the same have the following advantages. Using the time indicating unit as the reference can get rid of the conventional trouble of the user caused by only converting the time into a series of numbers when listing the information, so that the relative time relationship between the events in the integration results can be more easily compared, and the integration results can easily form the time impression. Meanwhile, the integrating method of this disclosure is more suitable for the combination of the externally obtained information with the built-in schedule, so that the user can handle the information more easily through the special display arrangement. After combined with the orientation sensing technology and the editing technology, it is convenient for the user to easily and selectively display the specific source of event information, for example, when the user goes outdoors or operates the device by one single hand. Meanwhile, various multimedia information may be integrated into the information display unit by additional inputs, thereby making the contents become richer.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. An information integration method applied to a touch display device, the information integration method comprising the steps of:
    displaying a time indicating unit on the touch display device;
    obtaining a plurality of event information, wherein the event information are provided by a first source and a second source; and
    displaying a plurality of information display units representing the event information provided by the first source and the second source on the touch display device in accordance with time data associated with the event information and in correspondence with the time indicating unit,
    wherein when a first orientation change event is provided to the touch display device, the event information provided from the first source are solely displayed.

2. The information integration method according to claim 1, wherein the information display unit is displayed on an outer side of a circumference of the time indicating unit.

3. The information integration method according to claim 1, wherein the touch display device obtains a plurality of the event information, and distances from the information display units, displayed in correspondence with the plurality of the event information of the same source, to the time indicating unit are the same.

4. The information integration method according to claim 3, wherein the information display units, displayed in correspondence with the plurality of the event information of different sources are arranged in radial patterns or concentric circles with respect to the time indicating unit.

5. The information integration method according to claim 1, wherein the information display unit is displayed on one side of the time indicating unit.

6. The information integration method according to claim 1, wherein the event information is provided by a servo device, provided by a storage module of the touch display device or provided by the touch display device executing an application program.

7. The information integration method according to claim 1, further comprising a step of:
    providing a touch event to the touch display device to edit information contents of the information display unit.

8. The information integration method according to claim 1, further comprising a step of:
    providing a touch event to the touch display device to zoom and/or expand the information display unit.

9. The information integration method according to claim 1, further comprising a step of:
    providing a second orientation change event to the touch display device to solely display the event information provided from the second source.

10. A touch display device, comprising:
    a touch display module displaying a time indicating unit;
    a processing module obtaining a plurality of event information provided from a first source and a second source and displaying a plurality of information display units representing the event information provided by the first source and the second source on the touch display module in accordance with time data associated with the event information and in correspondence with the time indicating unit; and
    an orientation sensing module for sensing a first orientation change event,
    wherein when the orientation sensing module senses a first orientation change event, the processing module solely displays the event information provided from the first source according to the first orientation change event.

11. The touch display device according to claim 10, wherein the information display unit is fan-shaped, is displayed on an outer side of a circumference of the time indicating unit and is displayed with the information display unit partially covering the time indicating unit.

12. The touch display device according to claim 11, wherein the processing module obtains a plurality of the event information and displays a plurality of the information display units, and the information display units are displayed in a partially overlapped manner.

13. The touch display device according to claim 10, wherein the processing module obtains a plurality of the event information, and distances from the information display units, displayed in correspondence with the plurality of the event information of the same source, to the time indicating unit are the same.

14. The touch display device according to claim 11, wherein the information display units, displayed in correspondence with the plurality of the event information of different sources are arranged in radial patterns or concentric circles with respect to the time indicating unit.

15. The touch display device according to claim 10, wherein the event information is provided by a servo device, provided by a storage module of the touch display device or provided by the touch display device executing an application program.

16. The touch display device according to claim 10, wherein the touch display device obtains a touch event, and the processing module edits information contents of the information display unit according to the obtained touch event.

17. The touch display device according to claim 10, wherein the touch display device obtains a touch event, and the processing module zooms and/or expands the information display unit according to the obtained touch event.

18. The touch display device according to claim 10, wherein the orientation sensing module senses a second orientation change event, and the processing module solely displays the event information provided from the second source according to the second orientation change event.

* * * * *